United States Patent [19]

Jessop

[11] 4,078,225
[45] Mar. 7, 1978

[54] ARRANGEMENT AND A METHOD FOR ERROR DETECTION IN DIGITAL TRANSMISSION SYSTEMS

[75] Inventor: Anthony Jessop, Harlow, England

[73] Assignee: International Standard Electric Corporation, New York, N.Y.

[21] Appl. No.: 705,729

[22] Filed: Jul. 15, 1976

[30] Foreign Application Priority Data

Jul. 28, 1975  United Kingdom ............... 31572/75

[51] Int. Cl.² ..................... G06F 11/10; G08C 25/00
[52] U.S. Cl. ................. 340/146.1 AG; 340/146.1 AB
[58] Field of Search ........... 340/146.1 AG, 146.1 AB, 340/146.1 AL; 178/23 A; 325/41

[56] References Cited

U.S. PATENT DOCUMENTS

| | | | |
|---|---|---|---|
| 3,278,898 | 10/1966 | Rumble | 340/146.1 AG |
| 3,412,380 | 11/1968 | Heller et al. | 340/146.1 AL |
| 3,611,141 | 10/1971 | Waters | 325/41 |
| 3,909,783 | 9/1975 | Kashio | 340/146.1 AG |

Primary Examiner—Charles E. Atkinson
Attorney, Agent, or Firm—John T. O'Halloran; Alfred C. Hill

[57] ABSTRACT

To convey parity checking information in a digital transmission system a predetermined digital word is replaced at the transmitter by a unique digital word having the same number of bits which is not allowable in the normal digital stream. The unique word is recognized at the receiver as indicating a particular parity condition. No extra capacity or higher digit rate for the digital stream is required for the parity checking information.

17 Claims, 2 Drawing Figures

ARRANGEMENT AND A METHOD FOR ERROR DETECTION IN DIGITAL TRANSMISSION SYSTEMS

BACKGROUND OF THE INVENTION

The present invention relates to digital transmission systems and more particularly to the detecting of errors in such systems.

In digital transmission systems it is common to use redundant coding to aid transmission. A typical form of redundant coding is that known as 4B3T in which 4-digit binary words are re-coded into 3-digit ternary words. The re-coding can be arranged so that the disparity of the transmitted signals can be kept to a minimum. Also, in digital transmission systems it is common to provide error detection facilities such as parity checking. However, such checking requires that parity check information be transmitted in addition to the digital signals which are being checked. One way of doing this is to send extra signals and to allow for these by increasing the digit rate of the system.

SUMMARY OF THE INVENTION

An object of the present invention is to provide a method and an arrangement for detecting errors in digital transmission systems, such as pulse code modulation (PCM) systems, without increased digit rates.

A feature of the present invention is the provision of a method for detecting errors in digital transmission systems by performing parity checking operations comprising the steps of replacing at a transmitter of the system a predetermined allowable combination of successive digits having a given number of digits with a unique combination of successive digits having the given number of digits carrying parity checking information, the unique combination normally not being allowed in a transmitted digital stream; decoding at a receiver of the system the unique combination in a received digital stream; and recognizing the decoded unique combination as carrying parity checking information.

Another feature of the present invention is the provision of a method for detecting errors in digital transmission systems by performing parity checking operations comprising the step of replacing at a transmitter of the system a predetermined allowable combination of successive digits having a given number of digits with a unique combination of successive digits having the given number of digits carrying parity checking information, the unique combination normally not being allowed in a transmitted digital stream.

A further feature of the present invention is the provision of a method for detecting errors in digital transmission systems by performing parity checking operation comprising the steps of receiving at a receiver of the system a transmitted digital data stream including a unique normally unallowable combination of successive digits having a given number of digits in place of a predetermined allowable combination of successive digits having the given number of digits, the unique combination carrying parity checking information; decoding the received unique combination; and recognizing the decoded unique combination as carrying parity checking information.

Still another feature of the present invention is the provision of an arrangement for detecting errors in a digital transmission system comprising: a transmitter including a first means to determine parity information of a sequence of digital signals to be transmitted over the system, second means to detect an allowable predetermined combination of successive digits having a given number of digits in the sequence of digital signals to be transmitted, the occurrence of the predetermined combination signifying the end of the sequence of digital signals to be transmitted, third means coupled to the first and second means to replace the predetermined combination with a unique combination of successive digits having the given number of digits when the parity information has one particular significance, the unique combination being a combination of successive digits which is normally unallowable in a train of digital signals to be transmitted, and fourth means coupled to the third means to transmit the train of digital signals including one of the unique combination and the predetermined combination; and a receiver including fifth means coupled to the fourth means to determine parity information of a sequence of received digital signals, the end of the sequence of received digital signals being signified by a recognition of one of the unique combination and the predetermined combination, and sixth means coupled to the fourth means and fifth means to generate an error signal when the parity information determined by the fifth means differs from the parity information determined by the first means as signified by receiving a given one of the unique combination and the predetermined combination.

Still a further feature of the present invention is the provision of an arrangement for detecting errors in a digital transmission system comprising: a transmitter including a first means to determine parity information of a sequence of digital signals to be transmitted over the system, second means to detect an allowable predetermined combination of successive digits having a given number of digits in the sequence of digital signals, the occurrence of the predetermined combination signifying the end of the sequence of digital signals, third means coupled to the first and second means to replace the predetermined combination with a unique combination of successive digits having the given number of digits when the parity information has one particular significance, the unique combination being a combination of successive digits which is normally unallowable in a train of digital signals to be transmitted, and fourth means coupled to the third means to transmit the train of digital signals including one of the unique combination and the predetermined combination.

Another feature of the present invention is the provision of an arrangement for detecting errors in a digital transmission system comprising: a receiver including first means to receive a train of digital signals including one of an allowable predetermined combination of successive digits having a given number of digits and a unique combination of successive digits having the given number of digits replacing the predetermined combination if a transmitter of the system determines that parity information of a sequence of digital signals has one particular significance, the unique combination being a combination of successive digits which is normally unallowable in the train of digital signals, second means coupled to the first means to determine parity information of a sequence of received digital signals, the end of the sequence of received signals being signified by a recognition of one of the unique combination and the predetermined combination, and third means coupled to the first means and the second means to generate an error signal when the parity information determined by the second means differs from the parity information determined by the transmitter as signified by receiving a given one of the unique combination and the predetermined combination.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
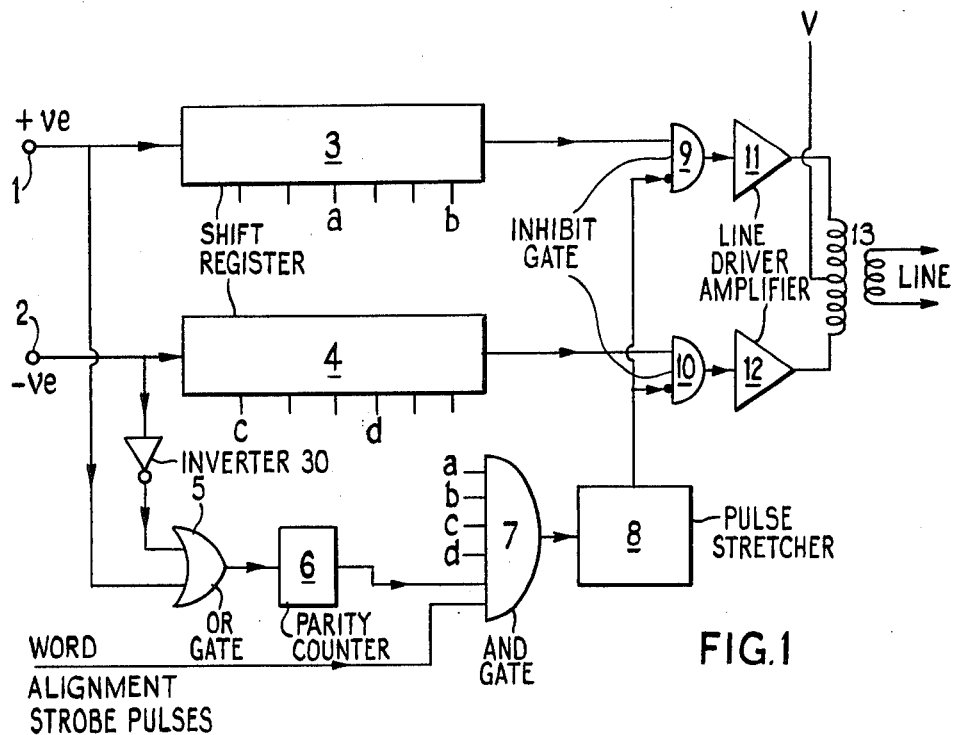
FIG. 1 is a block diagram of a transmitter for determining and transmitting parity information in accordance with the principles of the present invention.

The following description refers to a PCM system in which a 4B3T coding arrangement is used. That is, the line code used for transmission purposes is a ternary code employing redundancy to minimize the disparity of the transmitted signals. The 4B3T PCM system is fully disclosed in U.S. Pat. No. 3,611,141, whose disclosure is incorporated herein by reference. It is assumed that the ternary code has already been generated and is presented at terminals 1 and 2 of FIG. 1 as positive and negative "marks," respectively. The positive and negative inputs are fed into shift registers 3 and 4, respectively, at the ternary transmission bit rate. The positive and negative marks are also fed to an OR gate 5 the output of which feeds a parity counter 6, in which the parity of the ternary signals is determined. The negative marks are fed to OR gate 5 through inverter 30. The contents of shift registers 3 and 4 are selectively fed in parallel to AND gate 7 together with the output of counter 6 and word alignment strobe pulses (source not shown). AND gate 7 detects a particular ternary combination or word (word aligned) which can be replaced with a unique ternary combination of digits or a digital word that is not allowable in the ternary bit stream. The ternary combination or digital word detected by gate 7 and the unallowable unique combination or digital word should both have the same, preferably zero, disparity. Thus, a particular ternary combination or digital word $+1, 0, -1; +1, 0, -1$, for example, can be replaced by a unique ternary combination or digital word $0,0,0,;0,0,0$ — a unique combination which would never be found in a message of transmitted ternary bit stream. When gate 7 detects such a particular ternary combination or digital word, it will deliver an output for one out of two possible parity values as determined by counter 6. In other words, gate 7 will only deliver a '1,' say, if when the particular ternary combination or digital word is detected the output of the parity counter is a '1.' Counter 6 can conveniently be a bistable element. The '1' output of gate 7 is fed to a pulse stretcher 8 which produces an output pulse the duration of which is equal to the number of digit periods in the unique combination or digital word. This stretched output is used to block INHIBIT gates 9 and 10 through which the positive and negative marks pass, having been read out serially from shift registers 3 and 4 at the ternary digit rate. The result of this is to replace the detected particular ternary combination or digital word with a string of zeros. The outputs of gates 9 and 10 go to line driver amplifiers 11, 12 and then to the line coupling transformer 13.

At the receiver the incoming ternary signals pass first through a line circuit 20 and are then applied to a full-wave rectifier 21 where the positive and negative marks are brought to the same polarity. The rectified signals are fed to a parity counter 22 and to a shift register 23. The contents of shift register 23 are applied in parallel to AND gate 24 which samples the output of counter 22, via EXCLUSIVE OR gate 25, when the contents of register 23 are either six "ones" or six "zeros." The output of counter 22 should have a particular value to match the contents of register 23 when the counter is sampled. If the counter does not have this value when sampled an output from gate 24 drives a pulse stretcher circuit 26. The error indicating output of the pulse stretcher circuit is fed to low speed logic circuit 27 for processing, e.g., to initiate alarms or calculate the mean error rate, etc.

Figure 2:
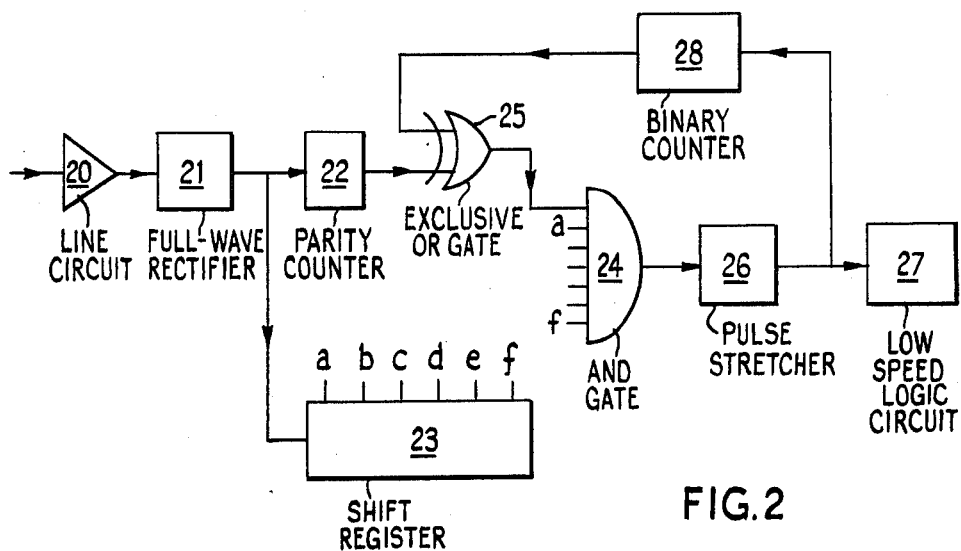
FIG. 2 is a block diagram of a receiver for performing a parity checking operation in accordance with the principles of the present invention.

It will be appreciated that after an error has been indicated by a parity failure it is necessary to reset counter 22 so that, assuming there is no further error, the parity of the next sequence will be correctly determined. However, in high speed PCM systems, e.g., operating at 560 Mbits/s, resetting of a counter within one digit period can cause a problem. In the arrangement shown in FIG. 2 this problem is avoided by taking the slow speed output of pulse stretcher circuit 26 and feeding it, via a binary counter 28, to EXCLUSIVE-OR gate 25. This gate will act as an inverter of the output of counter 22, when a parity failure has been detected. The effect of this is the same as if counter 22 had been reset. Because the output of counter 22, via gate 25, is only effective when a unique combination or digital word is detected, there is plenty of time between successive operations of gate 24 to effect the "resetting" operation. Once "resetting" has occurred there is no need to take further action at gate 25 until another parity failure occurs. The function of binary counter 28 is to "hold" the condition of gate 25 until the next parity failure occurs. Both counters 22 and 28 can be realized as simple bistable elements.

Provided that the unique unallowable combination or digital word is word-aligned with a word or words in the ternary digit stream no special circuitry is needed at the receiver to decode the ternary signals other than to hold the alternative decoding instruction in the decoder memory. If the unique combination or digital word is not word-aligned extra circuitry is needed to restore the original ternary combination or digital word before decoding can take place. Although in the above example the unique combination or digital word is formed by changing all the positive and negative marks to zero for ease of implementation it will be appreciated that any combination not allowable by the line code translation rules could be used.

It will be appreciated that the particular ternary combinations or digital words in the re-coded data that may be replaced by the unallowable unique combination or digital word can occur too frequently at times to allow adequate time for satisfactory parity checking operations. In particular, time is needed to allow proper operation of the pulse stretching circuits 8 and 26 and to allow proper "resetting" of counter 22 by gate 25. It may be necessary therefore to include at the transmitter logic to prevent parity checking operations occurring within a minimum period after a previous parity checking operation.

While I have described above the principles of my invention in connection with specific apparatus it is to be clearly understood that this description is made only by way of example and not as a limitation to the scope of my invention as set forth in the objects thereof and in the accompanying claims.

I claim:

1. A method for detecting errors in ternary coded transmission systems by performing parity checking operations comprising the steps of replacing, at a ternary coded transmitter of said system, a predetermined allowable combination of successive ternary digits having a given number of ternary digits with a unique combination of successive ternary digits having said given number of ternary digits carrying parity checking information, said unique combination normally not being allowed in a transmitted ternary coded digit stream;

decoding, at a ternary coded receiver of said system, said unique combination in a received ternary coded digit stream; and recognizing said decoded unique combination as carrying parity checking information.

2. A method for detecting errors in ternary coded transmission systems by performing parity checking operations comprising the step of replacing, at a ternary coded transmitter of said system, a predetermined allowable combination of successive ternary digits having a given number of ternary digits greater than two with a unique combination of successive ternary digits having said given number of ternary digits carrying parity checking information, said unique combination normally not being allowed in a transmitted ternary coded digit stream.

3. A method for detecting errors in ternary coded transmission systems by performing parity checking operation comprising the steps of receiving, at a ternary coded receiver of said system, a transmitted ternary coded data digit stream including a unique normally unallowable combination of successive ternary digits having a given number of ternary digits in place of a predetermined allowable combination of successive ternary digits having said given number of ternary digits, said unique combination carrying parity checking information;

decoding said received unique combination; and recognizing said decoded unique combination as carrying parity checking information.

4. An arrangement for detecting errors in a digital transmission system comprising:

a transmitter including a first means to determine parity information of a sequence of digital signals to be transmitted over said system, second means to detect an allowable predetermined combination of successive digits having a given number of digits in said sequence of digital signals to be transmitted, the occurrence of said predetermined combination signifying the end of said sequence of digital signals to be transmitted, third means coupled to said first and second means to replace said predetermined combination with a unique combination of successive digits having said given number of digits when said parity information has one particular significance, said unique combination being a combination of successive digits which is normally unallowable in a train of digital signals to be transmitted, and fourth means coupled to said third means to transmit said train of digital signals including said unique combination when said parity information has said one particular significance and said predetermined combination when said parity information does not have said one particular significance; and a receiver including fifth means coupled to said fourth means to determine parity information of a sequence of received digital signals, the end of said sequence of received digital signals being signified by a recognition of one of said unique combination and said predetermined combination, and sixth means coupled to said fourth means, and fifth means to generate an error signal when said parity information determined by said fifth means differs from said parity information determined by said first means as signified by receiving a given one of said unique combination and said predetermined combination.

5. An arrangement according to claim 4, wherein said second means includes first shift register means in which successive sequences of digital signals are held prior to transmission, and first coincidence logic means coupled in parallel to said first shift register means, said first means and said third means to produce and output signal to enable said third means when said parity information determined by said first means has said one particular significance in coincidence with said predetermined combination being present in said first shift register means.

6. An arrangement according to claim 5, wherein said sixth means includes second shift register means coupled to said fourth means into which successive sequences of received digital signals are fed, second coincidence logic means coupled in parallel to said second shift register means and said fifth means to produce said error signal when said parity information determined by said fifth means indicates a parity different from that of said sequence of received digital signals in said second shift register means, and seventh means coupled to said second coincidence logic means and said fifth means to reset said fifth means when said error signal is produced.

7. An arrangement according to claim 5, wherein said third means includes inhibit means coupled to said first shift register means and said first coincidence logic means to inhibit transmission of all digits of said predetermined combination when said output signal is produced.

8. An arrangement according to claim 7, wherein said sixth means includes second shift register means coupled to said fourth means into which successive sequences of received digital signals are fed, second coincidence logic means coupled in parallel to said second shift register means and said fifth means to produce said error signal when said parity information determined by said fifth means indicates a parity different from that of said sequence of received digital signals in said second shift register means, and seventh means coupled to said second coincidence logic means and said fifth means to reset said fifth means when said error signal is produced.

9. An arrangement according to claim 4, wherein said third means includes inhibit means coupled to said second means to inhibit transmission of all digits of said predetermined combination when said second means detects said predetermined combination.

10. An arrangement according to claim 9, wherein said sixth means includes a shift register means coupled to said fourth means into which successive sequences of received digital signals are fed, coincidence logic means coupled in parallel to said shift register means and said fifth means to produce said error signal when said parity information determined by said fifth means indicates a parity different from that of said sequence of received digital signals in said shift register means, and seventh means coupled to said coincidence logic means and said fifth means to reset said fifth means when said error signal is produced.

11. An arrangement according to claim 4, wherein said sixth means includes a shift register means coupled to said fourth means into which successive sequences of received digital signals are fed, coincidence logic means coupled in parallel to said shift register means and said fifth means to produce said error signal when said parity information determined by said fifth means indicates a parity different from that of said sequence of received digital signals in said shift register means, and seventh means coupled to said coincidence logic means and said fifth meand to reset said fifth means when said error signal is produced.

12. An arrangement for detecting errors in a digital transmission system comprising:

a transmitter including a first means to determine parity information of a sequence of digital signals to be transmitted over said system, second means to detect an allowable predetermined combination of successive digits having a given number of digits in said sequence of digital signals, the occurrence of said predetermined combination signifying the end of said sequence of digital signals, third means coupled to said first and second means to replace said predetermined combination with a unique combination of successive digits having said given number of digits when said parity information has one particular significance, said unique combination being a combination of successive digits which is normally unallowable in a train of digital signals to be transmitted, and fourth means coupled to said third means to transmit said train of digital signals including said unique combination when said parity information has said one particular significance and said predetermined combination when said parity information does not have said one particular significance.

13. An arrangement according to claim 12, wherein said second means includes shift register means in which successive sequences of digital signals are held prior to transmission, and coincidence logic means coupled in parallel to said shift register means, said first means and said third means to produce an output signal to enable said third means when said parity information determined by said first means has said one particular significance in coincidence with said predetermined combination being present in said shift register means.

14. An arrangement according to claim 13, wherein said third means includes inhibit means coupled to said shift register means and said coincidence logic means to inhibit transmission of all digits of said predetermined combination when said output signal is produced.

15. An arrangement according to claim 12, wherein said third means includes inhibit means coupled to said second means to inhibit transmission of all digits of said predetermined combination when said second means detects said predetermined combination.

16. An arrangement for detecting errors in a digital transmission system comprising:

a receiver including first means to receive a train of digital signals including an allowable predetermined combination of successive digits having a given number of digits when parity information at a transmitter of said system does not have a particular significance and a unique combination of successive digits having said given number of digits replacing said predetermined combination if said transmitter of said system determines that said parity information of a sequence of digital signals has said particular significance, said unique combination being a combination of successive digits which is normally unallowable in said train of digital signals, second means coupled to said first means to determine parity information of a sequence of received digital signals, the end of said sequence of received digital signals being signified by a recognition of one of said unique combination and said predetermined combination, and third means coupled to said first means and said second means to generate an error signal when said parity information determined by said second means differs from said parity information determined by said transmitter as signified by receiving a given one of said unique combination and said predetermined combination.

17. An arrangement according to claim 16, wherein said third means includes a shift register means coupled to said first means into which successive sequences of received digital signals are fed, coincidence logic means coupled in parallel to said shift register and said second means to produce said error signal when said parity information determined by said second means indicates a parity different from that of said sequence of received digital signals in said shift register means, and fourth means coupled to said coincidence logic means and said second means to reset said second means when said error signal is produced.

* * * * *